United States Patent
Kaneko et al.

(10) Patent No.: US 6,810,735 B2
(45) Date of Patent: Nov. 2, 2004

(54) SENSING APPARATUS AND ELECTRONIC EQUIPMENT USING THE SENSING APPARATUS

(75) Inventors: Hitoshi Kaneko, Kawagoe (JP); Tatsuya Okamoto, Kawagoe (JP); Isao Endo, Kawagoe (JP)

(73) Assignee: Pioneer Corporation, Tokyo-to (JP)

( * ) Notice: Subject to any disclaimer, the term of this patent is extended or adjusted under 35 U.S.C. 154(b) by 0 days.

(21) Appl. No.: 10/356,597

(22) Filed: Feb. 3, 2003

(65) Prior Publication Data

US 2003/0146358 A1 Aug. 7, 2003

(30) Foreign Application Priority Data

Feb. 4, 2002 (JP) .................................. P2002-027439

(51) Int. Cl.⁷ ........................... G01P 15/08; G01P 9/04
(52) U.S. Cl. .................... 73/493; 73/504.16; 73/514.32
(58) Field of Search ........................ 73/493, 431, 1.37, 73/1.38, 1.75, 1.77, 1.78, 1.82, 1.86, 504.16, 514.32; 248/274.1; 74/5.22

(56) References Cited

U.S. PATENT DOCUMENTS

| | | | |
|---|---|---|---|
| 4,562,978 A | * | 1/1986 | Durbin et al. .............. 244/1 R |
| 6,112,594 A | * | 9/2000 | Brinks et al. ................. 73/493 |
| 6,194,817 B1 | | 2/2001 | Yachi et al. |
| 6,301,982 B1 | * | 10/2001 | Kubo et al. .................. 74/5.22 |
| 6,446,913 B1 | | 9/2002 | Schroeder |
| 2002/0129652 A1 | | 9/2002 | Aigner et al. |

FOREIGN PATENT DOCUMENTS

| | | |
|---|---|---|
| DE | 198 33 157 A1 | 1/2000 |
| EP | 0 995 972 A1 | 4/2000 |
| JP | 9-42990 | 2/1997 |
| WO | WO 01/27561 A1 | 4/2001 |

* cited by examiner

*Primary Examiner*—John E. Chapman
(74) *Attorney, Agent, or Firm*—Nixon & Vanderhye, PC (57) ABSTRACT

A sensing apparatus comprises a sensing unit and a supporting unit. The sensing unit detects a direction and an amount of physical quantity applied thereto. The sensing unit has a detection reference axis along which the direction and the amount of the physical quantity are detected. The supporting unit stationarily supports the sensing unit. The sensing unit is inclined relative to the supporting unit by a predetermined angle so that a difference in angle between the detection reference axis and the direction of the physical quantity actually applied to the sensing unit when detecting the direction and the amount of the physical quantity is reduced.

6 Claims, 8 Drawing Sheets

PRIOR ART

SENSING APPARATUS AND ELECTRONIC EQUIPMENT USING THE SENSING APPARATUS

BACKGROUND OF THE INVENTION

1. Field of the Invention

The present invention relates to a sensing apparatus and movable body-mountable electronic equipment utilizing such an apparatus, and particularly to a sensing apparatus for detecting a physical quantity having a direction, such as acceleration and the electronic equipment, which utilizes such a sensing apparatus and is to be mounted on a movable body such as a vehicle.

2. Description of the Related Art

There has recently been widely available an apparatus for detecting the current position of a vehicle to facilitate movement of the vehicle, i.e., a so-called navigation apparatus.

The conventional navigation apparatus utilizes a so-called GPS (Global Positioning System) as well as another system for independently obtaining the traveling direction and distance of the vehicle from a predetermined reference point (more specifically, the starting point from which the vehicle travels), so as to detect the current position of the vehicle.

Many of the conventional navigation apparatus are provided with a gyro-sensor and an accelerometer for detecting acceleration applied to the vehicle, in order to obtain the current position, traveling direction and/or change in velocity of the vehicle with the use of the above-mentioned system for independently obtaining the current position thereof.

The conventional sensor such as the gyro-sensor and accelerometer has a detection reference axis along which the direction and amount of acceleration are detected. In actual cases, such a detection reference axis is provided in the form of a physical element or an imaginary element, taking into consideration the direction of acceleration to be detected by means of the sensor. The positional determination of such a detection reference axis relative to the sensor is made without taking into consideration a possibility that the navigation apparatus in which the sensor is mounted, may not be disposed on a horizontal plane. More specifically, these sensors having the predetermined characteristic features are mounted on the navigation apparatus, on the assumption that the respective detection reference axes are in parallel with a ground on which the vehicle drives. In such a case, the navigation apparatus is disposed on the vehicle so as to be also in parallel with the ground.

On the other hand, miniaturization of the navigation apparatus has recently advanced, thus making it possible to dispose the navigation apparatus in a central console of the vehicle.

With respect to an operation for disposing the navigation apparatus in the central console, in many cases, the navigation apparatus is placed so that the front surface of an operation panel of the navigation apparatus, on which a display unit and operation switches such as buttons are placed, is inclined relative to the vertical direction so as to face upward, in view of improvement in viewability of the display unit and operability of the switches. In a case where the navigation apparatus is placed on or under the other audio apparatus in the central console, the navigation apparatus is usually disposed so that the front surface of the operation panel is inclined relative to the vertical direction so as to face upward. Such a positional relationship can be achieved by mounting the navigation apparatus in itself in the central console in a tilted state (more specifically, so that the rear side of the navigation apparatus (which is the front side in the traveling direction of the vehicle) is placed lower than the front side thereof.

The switches such as the buttons of the navigation apparatus are usually operated with lower frequency than those of the other audio apparatus. Such a tendency may lead to a situation that the navigation apparatus is placed under the other audio apparatus in the central console. As a result, there may be a case where the inclination angle of the navigation apparatus as mounted relative to the horizontal plane becomes excessively large (more specifically, over the allowable angle (for example, 30 degrees) as described later.

In the above-described case, the direction of the detection reference axis of the sensor greatly deviates from the direction of acceleration actually applied to the sensor during an actual detection (i.e., the horizontal direction), thus causing an error such as offset in sensitivity of the sensor. As a result, there occur problems of deterioration of accuracy of positioning the current position and velocity of the vehicle.

Figure 8:
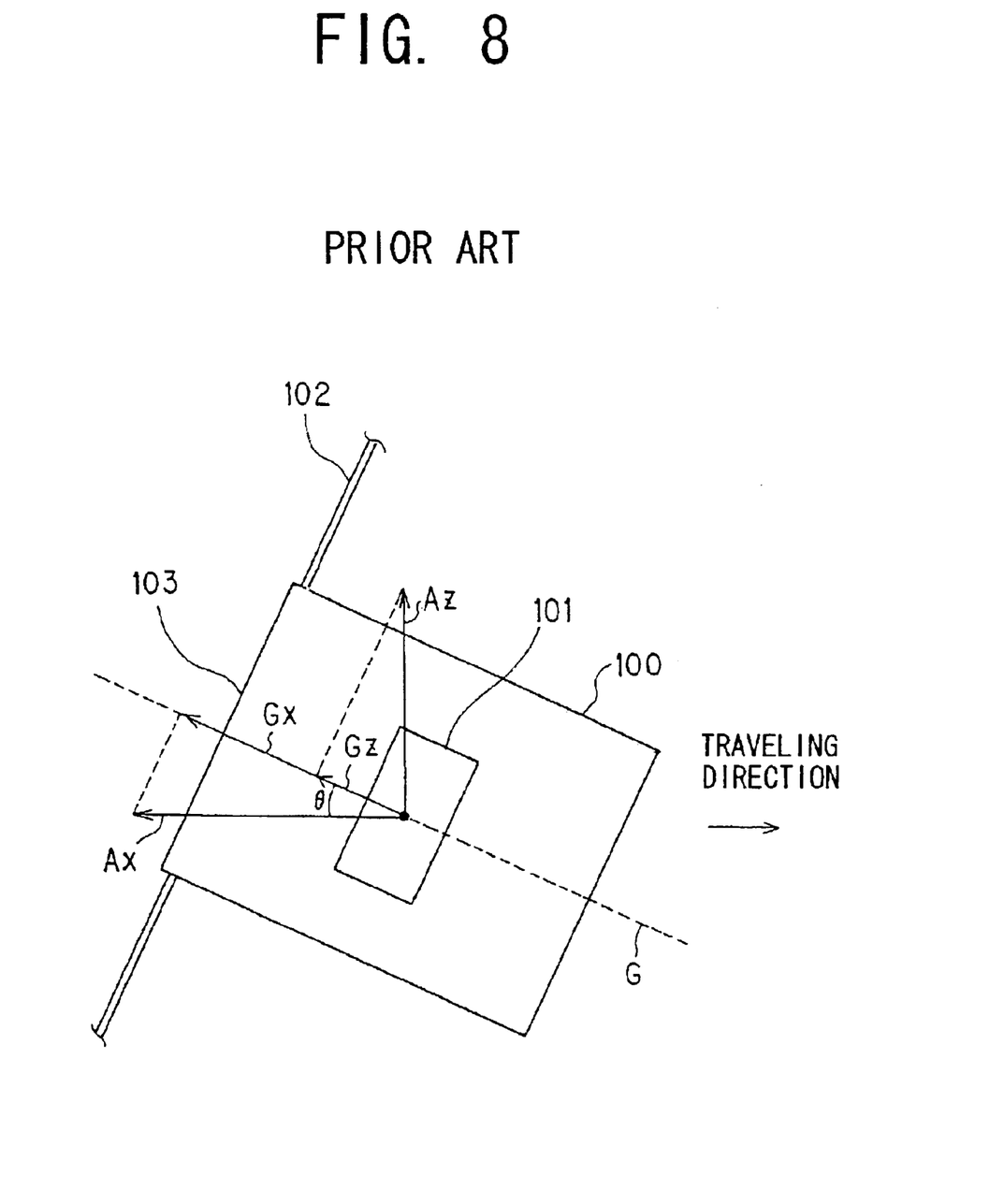
FIG. 8 is a descriptive view illustrating the conventional sensing apparatus.

Now, such problems will be described more in detail with reference to FIG. 8. FIG. 8 is a descriptive view illustrating the central console 102 in which the navigation apparatus 100 provided with the accelerometer 101 is mounted.

When the navigation apparatus 100 is inclined relative to the horizontal plane so that the operation panel 103 faces upward so as to be fitted into a receiving space of the central console 102, as shown in FIG. 8, the detection reference axis "G" of the accelerometer 101 is also inclined relative to the horizontal plane by the mounting angle "Θ" of the navigation apparatus 100 in accordance with the inclination thereof.

If the assumption is made that the vehicle drives forward to move rightward in FIG. 8, the acceleration actually applied to the navigation apparatus 100 during such a forward movement can be expressed by "Ax" having the opposite directional component to the forward movement.

When the acceleration "Ax" actually applied to the navigation apparatus 100 is detected by means of the accelerometer 101 having the detection reference axis, which is inclined by the mounting angle "Θ" of the navigation apparatus 100, the accelerometer 101 outputs the acceleration "Gx (Gx=cosΘ×Ax)" as the detection result, which has the smaller value than the actually applied acceleration "Ax".

On the other hand, acceleration vertically and upwardly applied to the navigation apparatus 100 (i.e., the vertically and upwardly applied thereto due to vibration of the vehicle and an impactive force from the ground) can be expressed by the acceleration "Az", which is perpendicular to the above-mentioned acceleration "Ax".

When the acceleration "Az" actually applied to the navigation apparatus 100 is detected by means of the accelerometer 101 in the same manner as the acceleration "Az", the accelerometer 101 outputs the acceleration "Gz (Gz=sinΘ×Az)" as the detection result, which is the sine element of the actually applied acceleration "Az".

The acceleration "At", which is detected through vector sum of the accelerations "Gx" and "Gz" as mentioned above by the accelerometer 101, can be expressed by the following formula:

$$At = Gx + Gz = \cos\Theta \times Ax + \sin\Theta \times Az$$

The resultant acceleration "At" differs from the acceleration "Ax" to be actually detected. Such a difference causes an error, which deteriorates accuracy of positioning the current position of the vehicle. As the mounting angle "Θ" of the navigation apparatus 100 increases, a tendency that the acceleration "Ax" to be actually detected is more remarkably influenced by the vertical acceleration "Az", rather than the acceleration "Ax" in the traveling direction of the vehicle, becomes more remarkable, thus leading to a noticeable error.

The conventional navigation apparatus has recently made a correction of the detection results obtained by the accelerometer or the gyro-sensor through a processing operation based on software for correcting the error. In addition, there has also been adopted a system for improving the accuracy of correction through a continuous learning process along with the movement of the vehicle.

However, the error correction carried out by the above-mentioned processing operation does not provide sufficient correcting effects, immediately after the navigation apparatus is mounted on the vehicle, thus causing a problem.

In addition, even when the error correction is carried out utilizing the software for correcting the error, an increased mounting angle "Θ" (for example, exceeding 30 degrees) may be outside the range of allowable angle, which has been predetermined for the sensor, thus also causing a problem.

It is conceivable to dispose the sensor in the navigation apparatus in the manufacturing process so that the above-mentioned mounting angle is decreased, thus avoiding the error of positioning due to the above-mentioned mounting angle. In such a case, it is necessary to dispose the sensor in the navigation apparatus so as to be inclined in a predetermined direction through specific measures or structural components, for the purpose of avoiding the above-mentioned error. Consequently, this leads to increased cost for manufacturing the navigation apparatus and reduction in yields.

In addition, disposing the sensor in the navigation apparatus so as to be inclined may hinder an effective use of the limited space in the casing of the navigation apparatus. Giving a higher priority to the above-mentioned measures to avoid the error may have an influence on the size of the navigation apparatus.

SUMMARY OF THE INVENTION

An object of the present invention, which was made to solve the above-mentioned problems, is therefore to provide a sensing apparatus, which detects acceleration applied to a vehicle, without causing an error of positioning due to the above-mentioned mounting angle, thus avoiding the problems of increased cost for manufacturing the navigation apparatus and reduction in yields, on the one hand, and an electronic equipment to be mounted on a movable body, which utilizes such a sensing apparatus.

In order to attain the aforementioned object, the sensing apparatus of the first aspect of the present invention comprises:

a sensing unit for detecting a direction and an amount of physical quantity applied thereto, said sensing unit having a detection reference axis along which the direction and the amount of the physical quantity are detected; and a supporting unit for stationarily supporting said sensing unit;

wherein:

said sensing unit is inclined relative to said supporting unit by an angle, said angle being predetermined so that a difference in angle between said detection reference axis and the direction of said physical quantity actually applied to said sensing unit when detecting the direction and the amount of said physical quantity is minimized.

Here, the sensing unit is inclined clockwise or counterclockwise relative to the direction of the physical quantity on a plane including the direction of the physical quantity.

Securing the sensing unit on the supporting unit so that the above-mentioned difference in angle is minimized makes it possible to accurately detect the amount and direction of the physical quantity.

In a case where the detected results from the sensing apparatus is subjected to an optional correction operation such as a processing operation to provide more accurate results, the range of possible error to be corrected is remarkably expanded, since the above-mentioned difference in angle is minimized in the sensing apparatus in itself.

In addition, it is possible to amount the sensing apparatus on an electronic equipment in the same manner as the conventional measures or through the conventional fitting elements during the manufacture of such an electronic equipment, without taking into consideration any measures to reduce the above-mentioned difference in angle. As a result, an effective use of the limited space in the casing of the electronic equipment can be ensured, the manufacturing cost can be decreased and the yields can be improved.

In the second aspect of the present invention, there may be adopted a structure in which said supporting unit comprises a base member and a mounting member secured to said base member; and said sensing unit is mounted on said mounting member.

The above-mentioned difference in angle is minimized by connection of the mounting member, which is placed between the sensing unit and the base member, with the sensing unit, thus making it possible to accurately detect the physical quantity in a simple structure. In addition, with respect to the other structural components than the above, there can be used the corresponding same components in the conventional sensing apparatus, thus making it possible to decrease the manufacturing cost and improve the yields.

In the third aspect of the present invention, there may be adopted a structure in which said mounting member has a slit formed therein; said sensing unit has a counter-slit formed therein; and said sensing unit is mounted on said mounting member so that said counter-slit of said sensing unit engages with said slit of said mounting member.

Merely forming the slit in the mounting member so as to incline to the predetermined direction, by which the above-mentioned difference in angle can be minimized, makes it possible to support the sensing unit on the mounting member in an appropriate manner, thus reducing the manufacturing cost of the sensing apparatus.

The structure in which the counter-slit of the sensing unit engages with the slit of the mounting member ensures an appropriate mounting state of the sensing unit on the mounting member, thus making it possible to manufacture the sensing apparatus in simple manufacturing processes.

In the fourth aspect of the present invention, there may be adopted a structure in which said sensing unit comprises a plurality of detection discs disposed in parallel with each other and a supporting shaft passing through a center of each of said detection discs to support said detection discs thereon, said supporting shaft serving as said detection reference axis; and said supporting shaft is secured to said supporting unit.

The sensing unit includes the supporting shaft, which is inclined so that the above-mentioned difference in angle is minimized. It is therefore possible to accurately detect physical quantity in a simple structure, even when the sensing unit further includes the detection discs supported on the supporting shaft, thus permitting reduction in the manufacturing cost and improvement in yields.

In the fifth aspect of the present invention, there may be adopted a structure in which said detection discs comprises a stationary electrode, which is stationarily supported on said supporting shaft and a pair of movable electrodes, which are supported on said supporting shaft on opposite sides of said stationary electrode so as to be movable in a direction of said supporting shaft.

Such a structure provides an accurate detection of physical quantity in a simple manner, thus permitting reduction in the manufacturing cost and improvement in yields.

Further, in order to attain the aforementioned object, the electronic equipment of the sixth aspect of the present invention comprises:

a main body; and a sensing apparatus provided in said main body, said sensing apparatus comprising (i) a sensing unit for detecting a direction and an amount of physical quantity applied thereto, said sensing unit having a detection reference axis along which the direction and the amount of the physical quantity are detected; and (ii) a supporting unit for stationarily supporting said sensing unit;

wherein:

said sensing unit is inclined relative to said supporting unit by an angle, said angle being predetermined so that a difference in angle between said detection reference axis and the direction of said physical quantity actually applied to said sensing unit when detecting the direction and the amount of said physical quantity is minimized.

The sensing unit is inclined so that the above-mentioned difference in angle is minimized, taking into consideration a mounting angle, by which the electronic equipment including the sensing unit is mounted on the movable body, thus enabling the sensing unit in the electronic equipment to detect accurately the direction and amount of physical quantity. In addition, the sensing apparatus per se has a structure in which the above-mentioned difference in angle is minimized, without need to provide independently any mechanism for inclining the sensing apparatus in itself. The above-mentioned structure has no influence on the effective use of the limited space in the electronic equipment, which is mountable on the movable body, thus permitting reduction in the manufacturing cost of the electronic equipment and improvement in yields.

The seventh to tenth aspects of the present invention have the same features as those of the above-mentioned second to fifth aspects of the present invention.

DETAILED DESCRIPTION OF THE PREFERRED EMBODIMENTS

Now, embodiments of a sensing apparatus and movable body-mountable electronic equipment of the present invention will be described in detail below with reference to the accompanying drawings.

There are described below the embodiments in which the present invention is applied to the sensing apparatus secured in the navigation apparatus serving as the electronic equipment that is mounted on a vehicle to provide a navigating effect.

[I] First Embodiment

Now, description will be given of the first embodiment of the present invention with reference to FIGS. 1 to 3(e).

In the first embodiment, the present invention is applied to a gyro-sensor (angular velocity sensor) for detecting angular velocity applied to a vehicle, when turning to the right or left.

Figure 1:
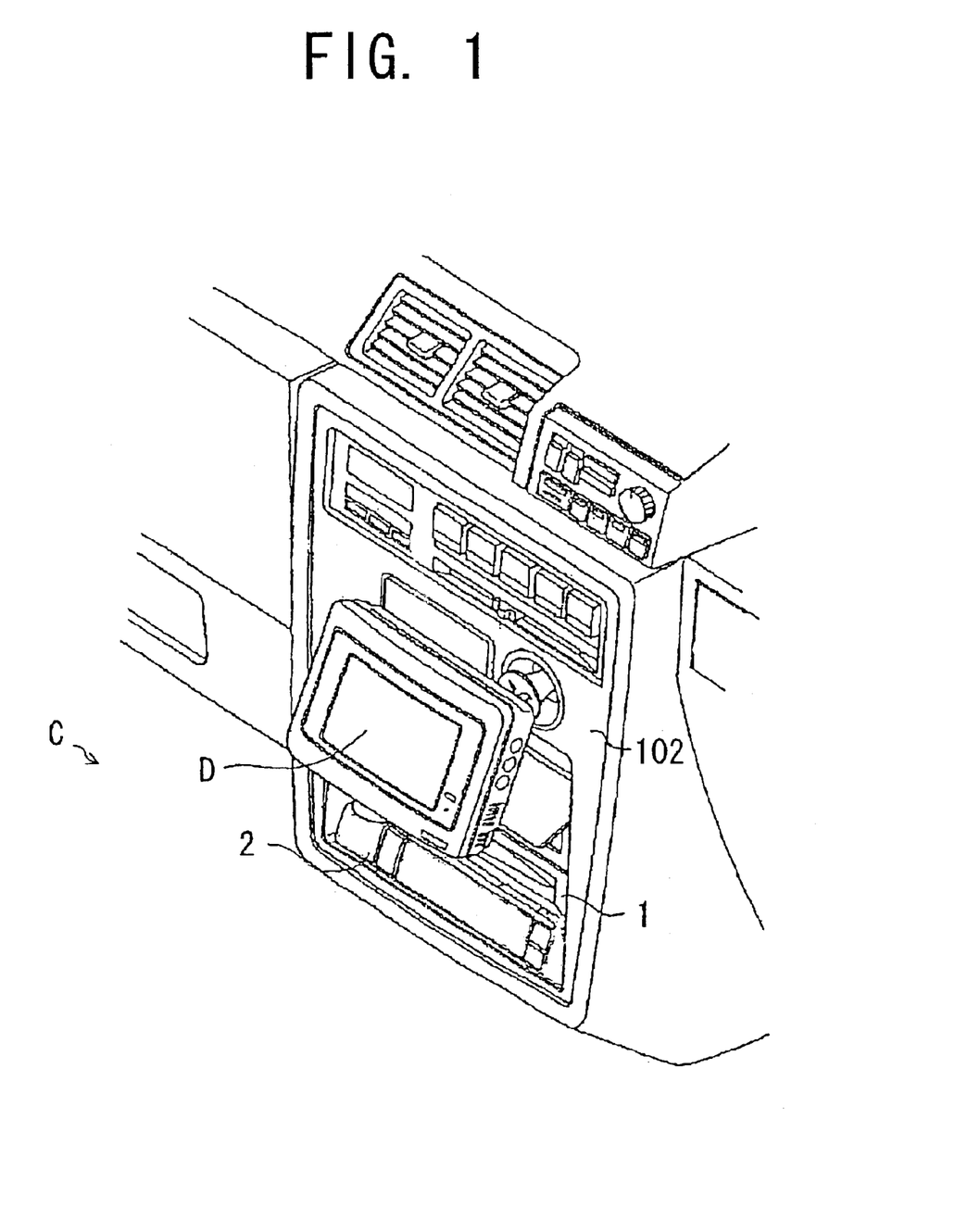
FIG. 1 is a partial perspective view of a room of an automobile, illustrating a central console in which a navigation apparatus utilizing a sensing apparatus of the first embodiment of the present invention.
Figure 2A:
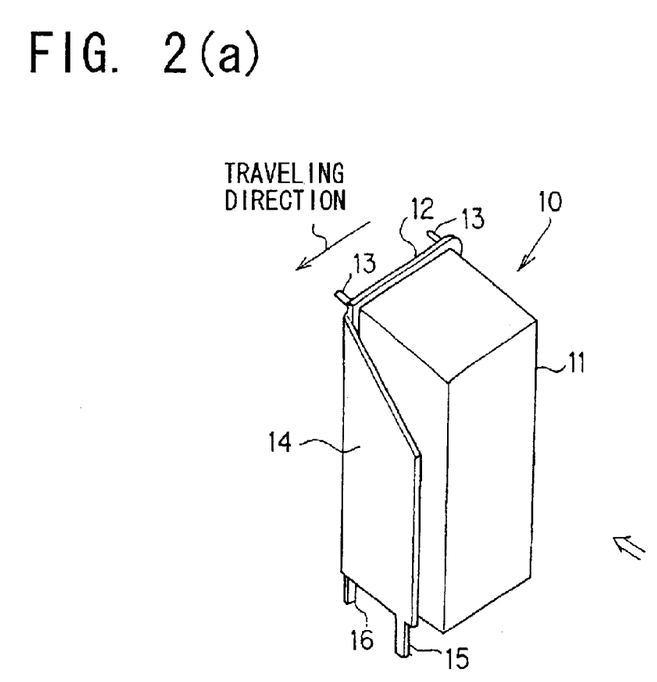
FIG. 2(a) is a perspective view illustrating an angular velocity sensor serving as a sensing unit of the sensing apparatus of the first embodiment of the present invention and FIG. 2(b) is a side view of the angular velocity sensor as shown in FIG. 2(a)
Figure 2B:
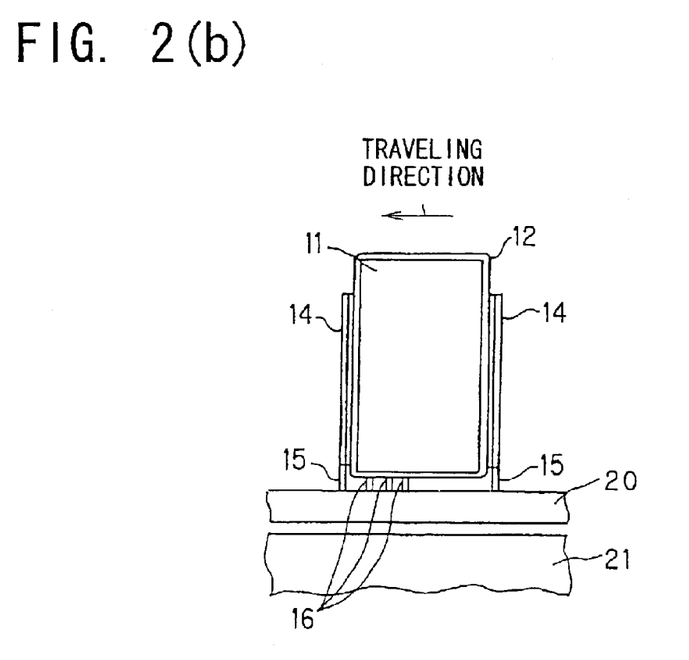
Figure 3A:
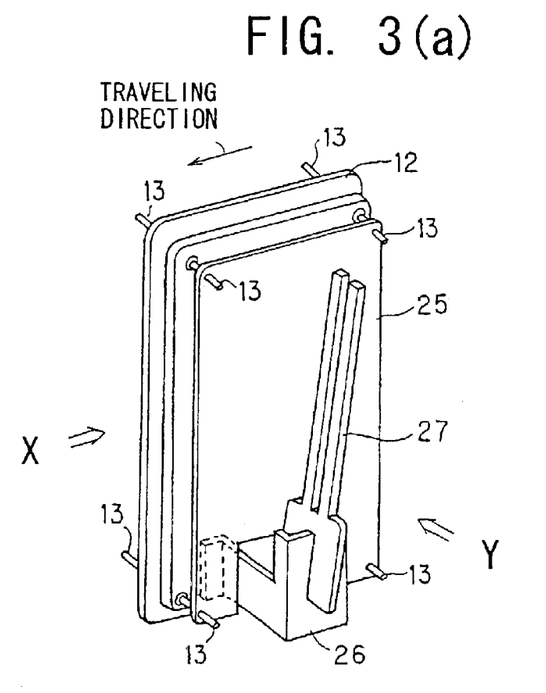
FIG. 3(a) is a perspective view illustrating the internal structure of the angular velocity sensor used in the first embodiment of the present invention.
Figure 3B:
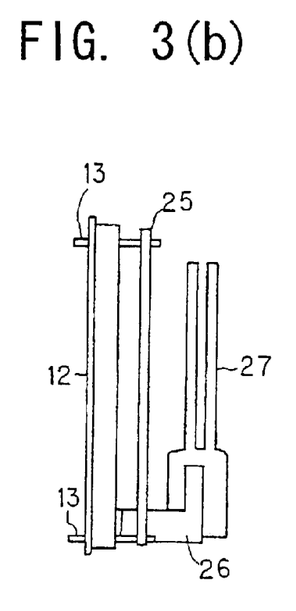
FIG. 3(b) is a front view of the angular velocity sensor, viewed in a direction "X" as shown in FIG. 3(a)
Figure 3C:
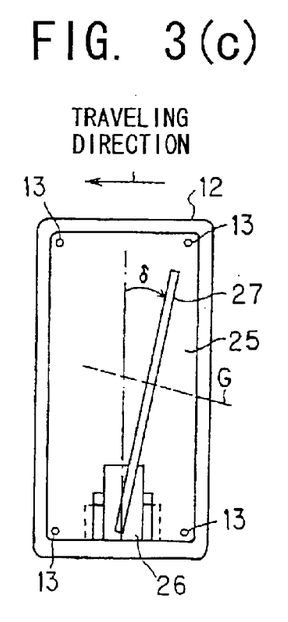
FIG. 3(c) is a side view of the angular velocity sensor, viewed in a direction "Y" as shown in FIG. 3(a)
Figure 3D:
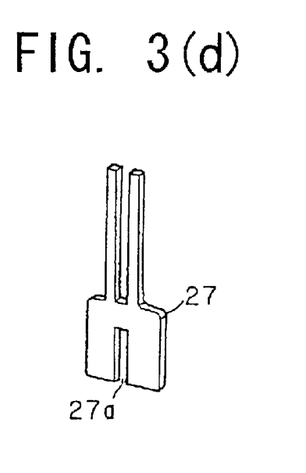
FIG. 3(d) is a perspective view of a sensing element serving as the sensing unit and FIG. 3(e) is a perspective view of a mounting member serving as a support unit.
Figure 3E:
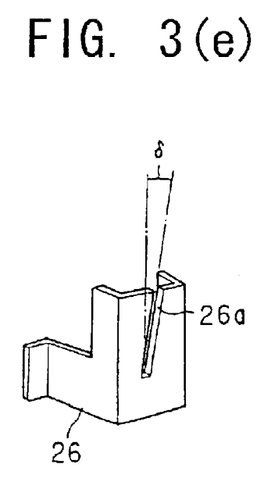

FIG. 1 is a partial perspective view of a room of an automobile, illustrating a central console including a navigation apparatus utilizing a sensing apparatus of the first embodiment of the present invention. FIG. 2(a) is a perspective view illustrating an angular velocity sensor serving as a sensing unit of the sensing apparatus of the first embodiment of the present invention and FIG. 2(b) is a side view of the angular velocity sensor as shown in FIG. 2(a). FIG. 3(a) is a perspective view illustrating the internal structure of the angular velocity sensor used in the first embodiment of the present invention, FIG. 3(b) is a front view of the angular velocity sensor, viewed in a direction "X" as shown in FIG. 3(a), FIG. 3(c) is a side view of the angular velocity sensor, viewed in a direction "Y" as shown in FIG. 3(a), FIG. 3(d) is a perspective view of a sensing element serving as the sensing unit and FIG. 3(e) is a perspective view of a mounting member serving as a support unit.

The navigation apparatus 1 according to the first embodiment of the present invention is mounted in the lower position of the central console 102, which is located in the front side of the room of the vehicle "C", so that an operation panel 2 of the navigation apparatus 1 is exposed in the vehicle room.

A retractable display "D" serving as a display unit, which is used in a navigation processing as carried out by the navigation apparatus 1, is disposed through a support member above the navigation apparatus 1 in the upper portion of the central console 102.

The navigation apparatus 1 is mounted in an inclined state relative to the horizontal plane including the traveling direction of the vehicle "C" so that the rear side (which is the front side in the traveling direction of the vehicle), which is deeply inserted into the central console, is placed lower than the front side thereof, as shown in FIG. 1. The operation panel 2 of the navigation apparatus 1 is directed obliquely upward to an operator in this manner, so as to improve operability of the operation panel 2.

Now, description will be given below of a structure of the angular velocity sensor provided in the navigation apparatus 1 according to the first embodiment of the present invention, with reference to FIGS. 2(a) to 3(e). In the first embodiment, the gyro-sensor utilizing a tuning fork-type piezoelectric element is used as the angular velocity sensor.

As shown in FIG. 2(a), the angular velocity sensor 10 according to the first embodiment of the present invention has a rectangular parallelepiped shape, which is defied by a casing 11 and a side plate 12 serving as the base member. The side plate 12 has connection terminals 13 formed thereon, which are connected to an internal circuit enclosed in the side plate 12 and the casing 11. The angular velocity sensor 10 is supported on a holder 14. The holder 14 is provided on its lower side with legs 15, which are fixed to a base plate 20 described later of the apparatus.

The above-mentioned connection terminals 13 are electrically connected to holder terminals 16 through a printed circuit (not shown), which is held between the holder 14 and the side plate 12. Consequently, the connection terminals 13 are electrically connected to the base plate 20 of the apparatus through the holder terminals 16.

Now, description will be given below of a mounting state of the angular velocity sensor 10 on the navigation apparatus 1, with reference to FIG. 2(b). FIG. 2(b) is a side view illustrating a mounting state of the angular velocity sensor 10, viewed in the direction shown by a double-lined arrow in FIG. 2(a).

As shown in FIG. 2(b), the angular velocity sensor 10 is vertically fixed, at its legs 15, on the base plate 20 of the apparatus, which is secured parallelly on the bottom of a casing 21 of the navigation apparatus 1. The internal circuit of the angular velocity sensor 10 and the base plate 20 of the apparatus are electrically connected to each other through the above-mentioned holder terminals 16.

Now, the internal structure of the angular velocity sensor 10 will be described with reference to FIGS. 3(a) to 3(e). FIG. 3(a) is a perspective view illustrating the internal structure of the angular velocity sensor 10 from which the casing 11 is removed, FIG. 3(b) is a front view of the angular velocity sensor 10, viewed in a direction "X" as shown in FIG. 3(a), FIG. 3(c) is a side view of the angular velocity sensor 10, viewed in a direction "Y" as shown in FIG. 3(a), FIG. 3(d) is a perspective view of a sensing element 27 serving as the sensing unit and FIG. 3(e) is a perspective view of a mounting member 26 serving as a support unit.

As shown in FIGS. 3(a) to 3(e), the turning fork-type sensing element 27 serving as the sensing unit, for detecting the direction and amount of angular velocity actually applied to the vehicle "C" is supported by the mounting member 26 serving as the supporting unit, in the inside of the angular velocity sensor 10. The mounting member 26 is fixed on the side plate 12. The direction of the detection reference axis "G" of the sensing element 27 coincides with the direction perpendicular to the longitudinal direction of the sensing element 27 on the vertical plane including the traveling direction of the vehicle "C", as shown in FIG. 3(c).

An internal circuit board 25 is disposed on the inner side of the side plate 12 and fixed thereto. The inner circuit board 25 has a recess in which the mounting member 26 is received. The inner circuit board 25 is provided thereon with an internal circuit (not shown), which is electrically connected to the sensing element 27 and the connection terminals 13, so as to execute necessary processing for detection of angular velocity applied to the vehicle "C".

In such a structure, the sensing element 27 is supported on the side plate 12 through the mounting member 26 so as to incline in the opposite direction to the traveling direction of the vehicle "C" by the angle "δ" on the vertical plane including such a traveling direction, as shown in FIGS. 3(a) to 3(c). The sensing element 27 does not incline relative to the vertical plane thereon, which is perpendicular to the traveling direction of the vehicle "C" (i.e., in the rightward or leftward direction in FIG. 3(b)).

The angular velocity sensor 10 having the internal structure as described above is vertically fixed on the base plate 20 of the apparatus, which is placed stationarily on the bottom of the casing 21 so as to be in parallel therewith, as shown in FIG. 2(b). When the navigation apparatus 1 including the casing 21 is mounted in the central console 102, the rear side of the navigation apparatus 1 is placed lower than the front side thereof so that the navigation apparatus 1 in itself inclines on the vertical plane including the traveling direction of the vehicle "C". As a result, the angular velocity sensor 10 is placed in a turned state in the counterclockwise direction in FIG. 3(c) so that the difference in angle between the detection reference axis "G" as shown in FIG. 3(c) and the traveling direction of the vehicle "C" is minimized by an angle "δ" as shown in FIG. 3(c).

When the detection of the angular velocity applied to the vehicle "C" is made through the angular velocity sensor 10, a correction operation is carried out optionally to correct a possible error due to the mounting angle of the navigation apparatus 1, through a processing circuit (not shown) included therein based on the similar error correction program to the conventional prior art. In this case, the sensing element 2 inclines by the predetermined angle "δ" to compensate the mounting angle of the navigation apparatus 1, as shown in FIG. 3(c), with the result that there actually suffices execution of the processing operation for correcting only the difference in angle between the inclination angle of the navigation apparatus 1 mounted in the central console 102 relative to the horizontal direction (i.e., the mounting angle of the navigation apparatus) and the above-mentioned angle "δ".

Now, description will be given below of a way of mounting the sensing element 27 on the mounting member 26 with reference to FIGS. 3(d) and 3(e).

As shown in FIG. 3(e), the mounting member 26 has a slit 26a formed therein. The longitudinal direction of the slit 26a inclines in the opposite direction to the traveling direction of the vehicle "C" by the above-mentioned angle "δ". On the other hand, as shown in FIG. 3(d), the sensing element 27 has a counter-slit 27a formed at its end so as to extend in the longitudinal direction. The extending direction of the slit 27a is perpendicular to the detection reference axis "G". The sensing unit 27 is mounted on the mounting member 26 so that the counter-slit 27a of the sensing element 27 engages with the slit 26a of the mounting member 26, as shown in FIGS. 3(a) and 3(c). The sensing element 27 and the mounting member 26, which is kept in such an engaging state, are fixed to each other through adhesive.

In the structure as described above of the angular velocity sensor 10 of the first embodiment of the present invention, the sensing element 27 is fixed in an inclined state in the assembling step of the angular velocity sensor 10 so that the above-mentioned difference in angle is minimized, thus making it possible to detect accurately the direction and amount of angular velocity.

In case where the detected results from the angular velocity sensor 10 is subjected to an optional correction operation such as a processing operation to provide more accurate results, the range of possible error to be corrected is remarkably expanded, since the above-mentioned difference in angle is minimized in the angular velocity sensor 10 in itself.

In addition, it is possible to mount the angular velocity sensor 10 on the navigation apparatus 1 in the same manner as the conventional measures or through the conventional fitting elements during the manufacture of the navigation apparatus 1, without taking into consideration any measures to reduce the above-mentioned difference in angle. As a result, an effective use of the limited space in the casing of the navigation apparatus 1 can be ensured, the manufacturing cost can be decreased and the yields can be improved.

The above-mentioned difference in angle is minimized by connection of the mounting member 26, which is placed between the sensing element 27 and the side plate 12, with the sensing element 27, thus making it possible to accurately detect the angular velocity in a simple structure. In addition, with respect to the other structural components than the above, there can be used the corresponding same components in the conventional angular velocity sensor, thus making it possible to decrease the manufacturing cost and improve the yields.

The sensing element 27 is placed in the specific position merely by inclining the slit 26a of the mounting member 26 in the predetermined direction by the angle "δ" so that the above-mentioned difference in angle is minimized, thus reducing the manufacturing cost of the angular velocity sensor 10.

The engagement of the counter-slit 27a of the sensing element 27 with the slit 26a of the mounting member 26 enables the sensing element 27 to be secured to the mounting member 26, thus permitting manufacture of the angular velocity sensor 10 in a simpler manufacturing process.

The inclination direction and angle "δ" of the sensing element 27 are predetermined so that the above-mentioned difference in angle is minimized, taking into consideration the mounting angle, by which the navigation apparatus 1 including the angular velocity sensor 10 is mounted on the vehicle "C", thus enabling the sensing element 27 in the navigation apparatus 1 to detect accurately the direction and amount of angular velocity. In addition, the angular velocity sensor 10 per se has the structure in which the above-mentioned difference in angle is minimized, without need to provide independently any mechanism for inclining the angular velocity sensor 10 in itself. The above-mentioned structure has no influence on the effective use of the limited space in the navigation apparatus 1, which is mountable on the vehicle "C", thus permitting reduction in the manufacturing cost of the navigation apparatus 1 and improvement in yields.

[II] Second Embodiment

Now, description will be given of the second embodiment of the present invention with reference to FIGS. 4(a) to 5(c).

In the second embodiment, the present invention is applied to a capacitance accelerometer for detecting acceleration applied to a vehicle, when increasing or reducing velocity thereof, while, in the first embodiment, the present invention is applied to the gyro-sensor (i.e. the angular velocity sensor) utilizing the tuning fork-type piezoelectric element.

The way of mounting the navigation apparatus provided with the accelerometer of the second embodiment is the same as that of the navigation apparatus 1 of the first embodiment as shown in FIG. 1. The detailed description thereof is omitted.

Now, description will be given below of the structure of the accelerometer according to the second embodiment, which is mounted on the navigation apparatus, with reference to FIGS. 4(a) to 5(c).

Figure 4A:
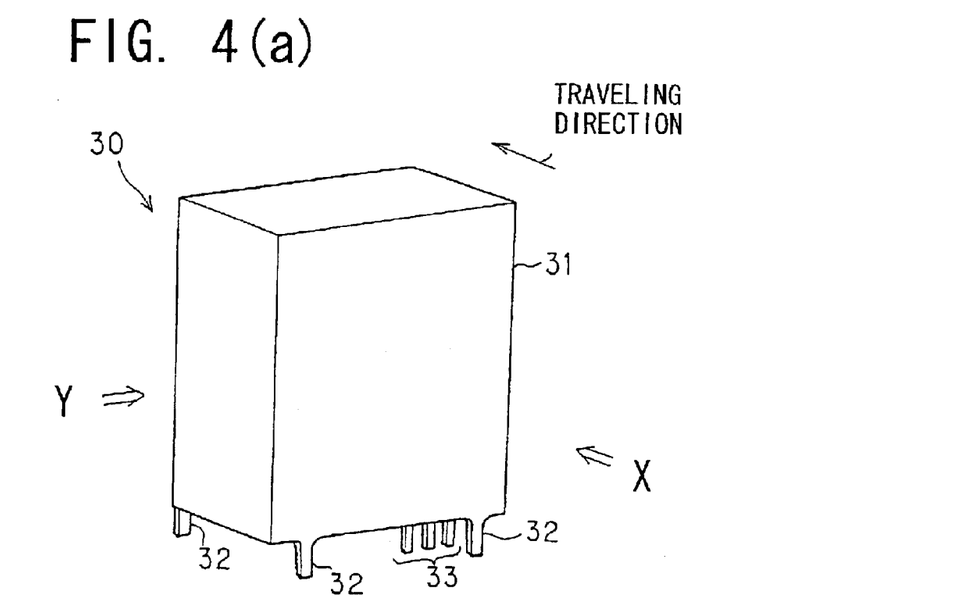
FIG. 4(a) is a perspective view illustrating the angular velocity sensor used in the second embodiment of the present invention.

As shown in FIG. 4(a), the accelerometer 30 according to the second embodiment has a rectangular parallelepiped shape, which is defined by a casing 31. The casing 31 is provided on its lower side with legs 32 by which the accelerometer 30 is secured on the base plate 20 of the apparatus. The casing 31 has connection terminals 33 formed thereon, which are connected to an internal circuit enclosed in the casing 31. The above-mentioned internal circuit is electrically connected through the connection terminals 33 to the base plate 20 of the apparatus.

Figure 4B:
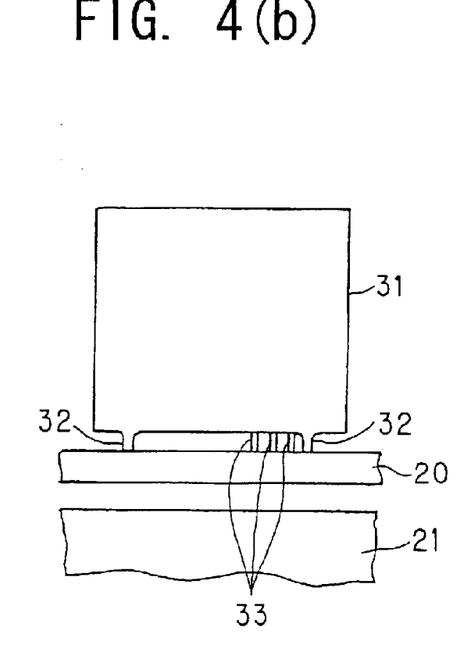
FIG. 4(b) is a rear view of the angular velocity sensor, viewed in a direction "X" as shown in FIG. 4(a)

Now, description will be given below of a mounting state of the accelerometer 30 on the navigation apparatus 1 of the second embodiment, with reference to FIGS. 4(b) and 4(c). FIG. 4(b) is a rear view of the accelerometer 30 as mounted, viewed in a direction "X" as shown in FIG. 4(a) and FIG. 4(c) is a side view of the accelerometer as mounted, viewed in a direction "Y" as shown in FIG. 4(a).

Figure 4C:
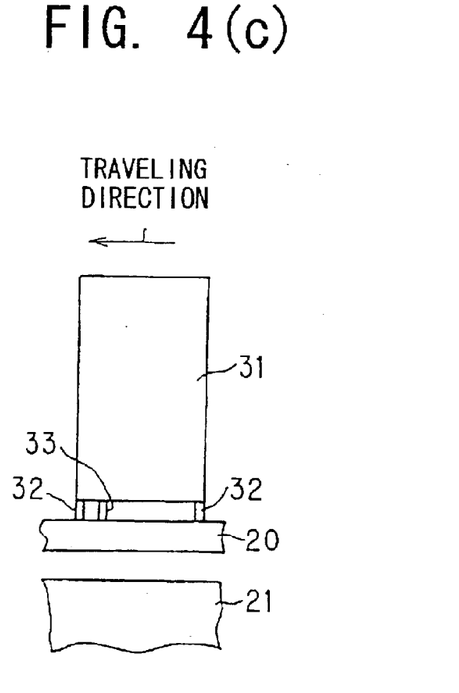
FIG. 4(c) is a side view of the angular velocity sensor, viewed in a direction "Y" as shown in FIG. 4(a)

As shown in FIGS. 4(b) and 4(c), the accelerometer 30 is vertically fixed, at its legs 32, on the base plate 20 of the apparatus, which is secured parallelly on the bottom of the casing 21 of the navigation apparatus of the second embodiment. The internal circuit of the accelerometer 30 and the base plate 20 of the apparatus are electrically connected to each other through the connection terminals 33.

Figure 5A:
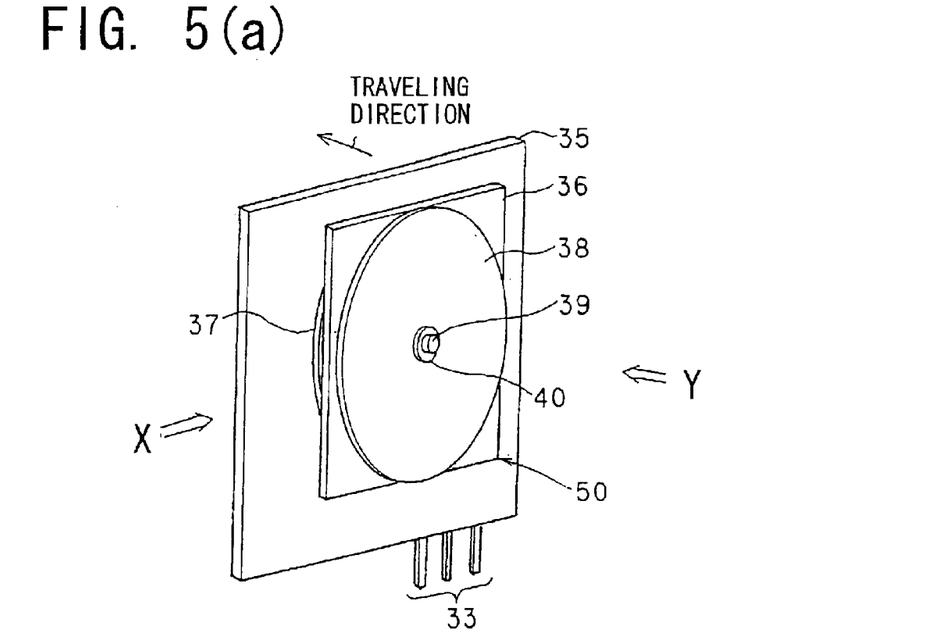
FIG. 5(a) is a perspective view illustrating the internal structure of the angular velocity sensor used in the second embodiment of the present invention.

Now, the internal structure of the accelerometer 30 will be described with reference to FIGS. 5(a) to 5(c). FIG. 5(a) is a perspective view illustrating the internal structure of the accelerometer 30 from which the casing 31 is removed, FIG. 5(b) is a side view of the accelerometer 30, viewed in a direction "X" as shown in FIG. 5(a) and FIG. 5(c) is a rear view of the accelerometer 30, viewed in a direction "Y" as shown in FIG. 5(a).

Figure 5B:
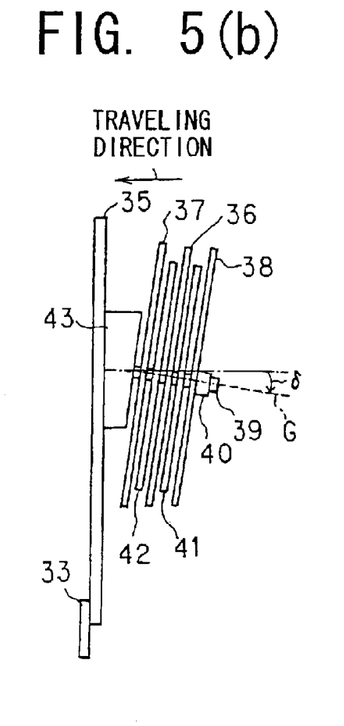
FIG. 5(b) is a side view of the angular velocity sensor, viewed in a direction "X" as shown in FIG. 5(a)
Figure 5C:
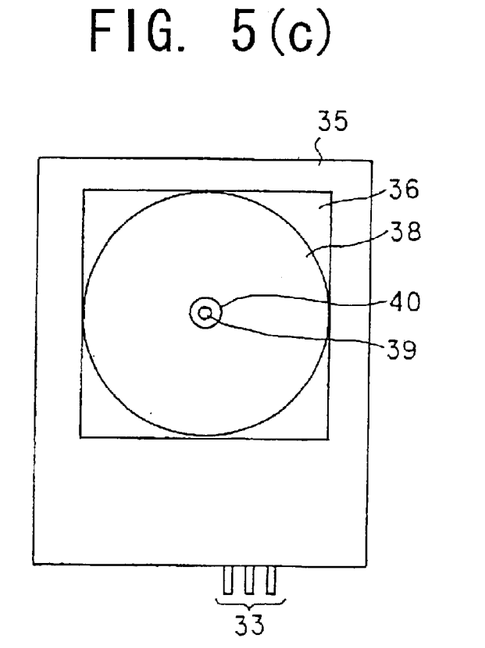
FIG. 5(c) is a rear view of the angular velocity sensor, viewed in a direction "Y" as shown in FIG. 5(a)

As shown in FIGS. 5(a) to 5(c), the sensing unit 50 for detecting the direction and amount of acceleration actually applied to the vehicle "C" is secured on an internal circuit board 35 in the accelerometer 30. The connection terminals 33 extend from the internal circuit board 35.

The sensing unit 50 includes a pair of disc-shaped guard electrodes 37, 38, a pair of disc-shaped movable electrodes 41, 42 serving as detecting discs, which are placed between the guard electrodes 37, 38, a rectangular stationary electrode 36, which is placed between the movable electrodes 41, 42, and a supporting shaft 39 passing through the central portion of each of the guard electrodes 37, 38, the movable electrodes 41, 42 and the stationary electrode 36. The supporting shaft 39 is secured at its one end on a base plate 43. A nut 40 is fitted to the other end of the supporting shaft 39 and tighten so that the guard electrodes 37, 38, the movable electrodes 41, 42 and the stationary electrode 36 are held between the base plate 43 and the nut 40 on the supporting shaft 39. The central axis of the supporting shaft 39 coincides with the detection reference axis "G" on the vertical plane including the traveling direction of the vehicle "C", which is perpendicular to the internal circuit board 35.

The inner circuit board 35 is provided thereon with an internal circuit (not shown), which is electrically connected to the sensing unit 50 and the connection terminals 13, so as to execute necessary processing for detection of acceleration applied to the vehicle "C".

In such a structure, the sensing unit 50 is supported on the inner circuit board 35 through the base plate 43 so as to incline in the opposite direction to the traveling direction of the vehicle "C" by the angle "δ" on the vertical plane including such a traveling direction, as shown in FIG. 5(b).

The accelerometer 30 having the internal structure as described above is vertically fixed on the base plate 20 of the apparatus, which is placed stationarily on the bottom of the casing 21 so as to be in parallel therewith, as shown in FIG. 4(b). When the navigation apparatus 1 according to the second embodiment, including the casing 21 is mounted in the central console 102, the rear side of the navigation apparatus 1 is placed lower than the front side thereof so that the navigation apparatus 1 in itself inclines on the vertical plane including the traveling direction of the vehicle "C" in the same manner as the first embodiment of the present invention. As a result, the accelerometer 30 is placed in a turned state in the counterclockwise direction in FIG. 5(b) so that the difference in angle between the detection reference axis "G" as shown in FIG. 5(b) and the traveling direction of the vehicle "C" is minimized by an angle "δ" as shown in FIG. 5(b).

When the detection of the acceleration applied to the vehicle "C" is made through the accelerometer 30, a correction operation is carried out optionally to correct a possible error due to the mounting angle of the navigation apparatus 1, through a processing circuit (not shown) included therein based on the similar error correction program to the conventional prior art, in the same manner as the first embodiment of the present invention. In this case, the sensing unit 50 inclines by the predetermined angle "δ" to compensate the mounting angle of the navigation apparatus 1, as shown in FIG. 3(c), with the result that there actually suffices execution of the processing operation for correcting only the difference in angle between the inclination angle of the navigation apparatus 1 mounted in the central console 102 relative to the horizontal direction (i.e., the mounting angle of the navigation apparatus) and the above-mentioned angle "δ".

In the structure as described above of the accelerometer 30 of the first embodiment of the present invention, the sensing unit 50 is fixed in an inclined state in the assembling step of the accelerometer 30 so that the above-mentioned difference in angle is minimized, thus making it possible to detect accurately the direction and amount of acceleration.

In case where the detected results from the accelerometer 30 is subjected to an optional correction operation such as a processing operation to provide more accurate results, the range of possible error to be corrected is remarkably expanded, since the above-mentioned difference in angle is minimized in the accelerometer 30 in itself.

In addition, it is possible to amount the accelerometer 30 on the navigation apparatus 1 in the same manner as the conventional measures or through the conventional fitting elements during the manufacture of the navigation apparatus 1 of the second embodiment of the present invention, without taking into consideration any measures to reduce the above-mentioned difference in angle. As a result, an effective use of the limited space in the casing of the navigation apparatus 1 can be ensured, the manufacturing cost can be decreased and the yields can be improved.

Further, the structure that the supporting shaft 39 of the sensing unit 50 inclines makes it possible to detect accurately physical quantity in a simpler structure, decrease the manufacturing cost and improve the yields, even when the capacitance sensing unit 50 supported on the supporting shaft 38 is used.

The inclination direction and angle "δ" of the sensing unit 50 are predetermined so that the above-mentioned difference in angle is minimized, taking into consideration the mounting angle, by which the navigation apparatus 1 including the accelerometer 30 is mounted on the vehicle "C", thus enabling the sensing unit 50 in the navigation apparatus 1 to detect accurately the direction and amount of acceleration. In addition, the accelerometer 30 per se has the structure in which the above-mentioned difference in angle is minimized, without need to provide independently any mechanism for inclining the accelerometer 30 in itself. The above-mentioned structure has no influence on the effective use of the limited space in the navigation apparatus 1, which is mountable on the vehicle "C", thus permitting reduction in the manufacturing cost of the navigation apparatus 1 and improvement in yields.

[III] Third Embodiment

Now, description will be given of the third embodiment of the present invention with reference to FIGS. 6(a) to 7.

In the third embodiment, the present invention is applied to a chip sensor, which includes an IC (Integrated Circuit) accelerometer and is integrated in itself through a bulk-micro machining technique, while in the first embodiment, the present invention is applied to the gyro-sensor (i.e., the angular velocity sensor) utilizing the tuning fork-type piezoelectric element, and in the second embodiment, the present invention is applied to a capacitance accelerometer for detecting acceleration applied to a vehicle, when increasing or reducing velocity thereof.

The way of mounting the navigation apparatus provided with the chip sensor of the third embodiment is the same as that of the navigation apparatus 1 of the first embodiment as shown in FIG. 1. The detailed description thereof is omitted.

Now, description will be given below of the structure of the chip sensor according to the third embodiment, which is mounted on the navigation apparatus, with reference to FIGS. 6(a) to 6(c). FIG. 6(a) is a perspective view illustrating the chip sensor serving as the sensing unit used in the third embodiment of the present invention, FIG. 6(b) is a side view of the chip sensor, viewed in a direction "X" as shown in FIG. 6(a) and FIG. 6(c) is a rear view of the chip sensor, viewed in a direction "Y" as shown in FIG. 6(a).

Figure 6A:
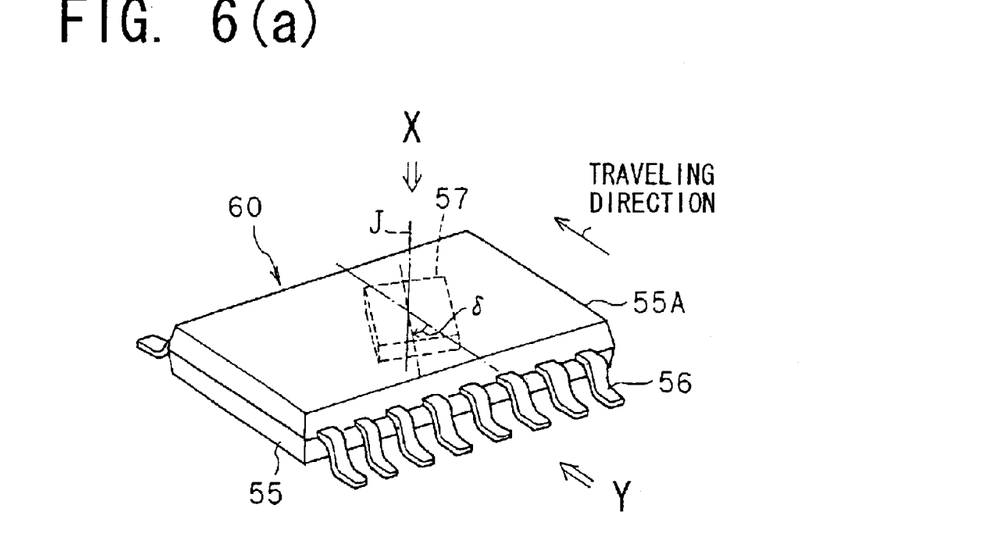
FIG. 6(a) is a perspective view illustrating a chip sensor serving as the sensing unit used in the third embodiment of the present invention.
Figure 7:
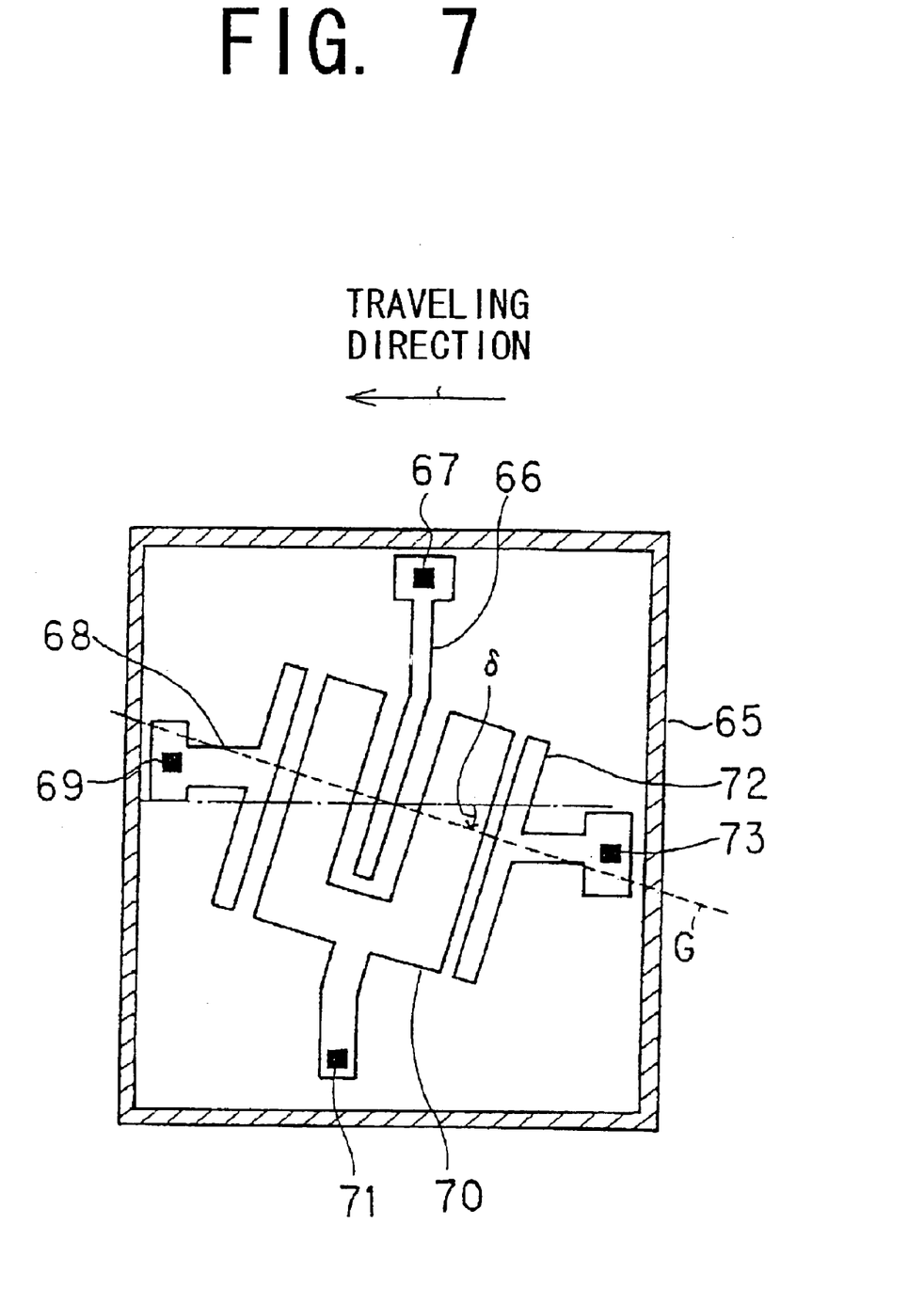
FIG. 7 is a view illustrating the internal structure of the chip sensor of the third embodiment of the present invention.

As shown in FIG. 6(a), the chip sensor 60 according to the third embodiment of the present invention has a typical shape known as the IC chip. The chip sensor 60 includes a main body 55 formed of synthetic resin and a plurality of connection terminals 56 embedded therein. The chip sensor 60 includes a sensing element 57 embedded therein, which is turned around an axis "J" perpendicular to the surface 55A of the main body 55 as shown in FIG. 6(a). The internal circuit including the above-mentioned sensing element 57 is electrically connected through the connection terminals 56 to the base plate 20 of the apparatus.

Now, description will be given below of a mounting state of the chip sensor 60 on the navigation apparatus 1 of the third embodiment, with reference to FIGS. 6(b) and 6(c).

Figure 6B:
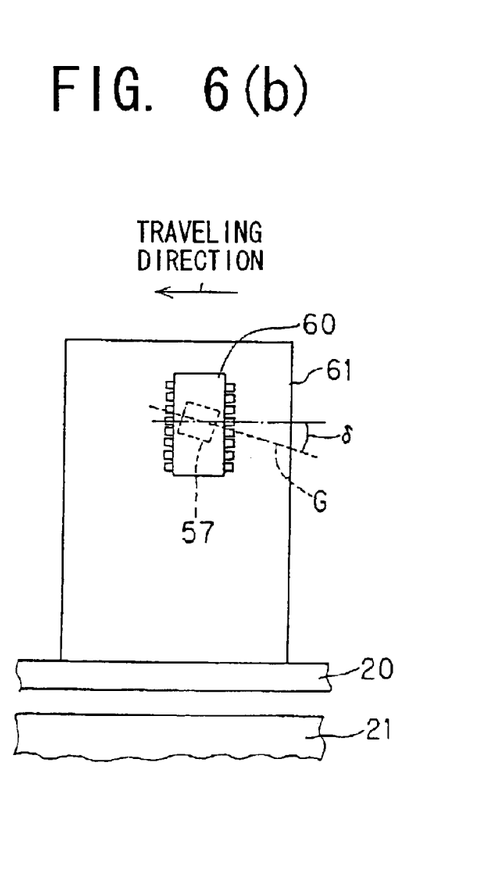
FIG. 6(b) is a side view of the chip sensor, viewed in a direction "X" as shown in FIG. 6(a)
Figure 6C:
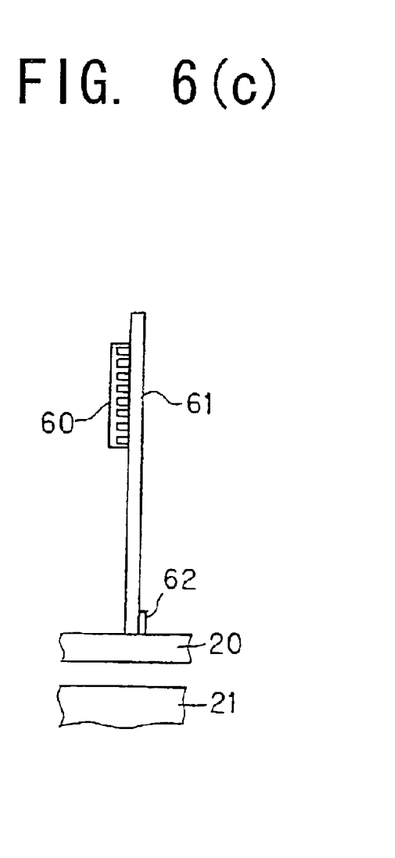
FIG. 6(c) is a rear view of the chip sensor, viewed in a direction "Y" as shown in FIG. 6(a)

As shown in FIGS. 6(b) and 6(c), a sub-circuit board 61 is vertically fixed through the connection terminal 62 to the bottom of the casing 21 of the navigation apparatus according to the third embodiment of the present invention. The chip sensor 60 is fixed on the above-mentioned sub-circuit board 61 so that the main surface of the sub-circuit board 61 and the surface 55A of the main body 55 are in parallel with each other. The internal circuit of the chip sensor 60 including the sensing element 57 and the base plate 20 of the apparatus are electrically connected to each other through the above-mentioned connection terminals 56, 62 and the sub-circuit board 61. The surface of the sub-circuit board 61, on which the chip sensor 60 is fixed, is in parallel with the traveling direction of the vehicle "C".

The sub-circuit board 61 is provided thereon with an internal circuit (not shown), which is electrically connected to the chip sensor 60, so as to execute necessary processing for detection of acceleration applied to the vehicle "C".

Now, the internal structure of the chip sensor 60 will be described.

As shown in FIGS. 6(a) and 6(b), the IC ship-shaped sensing element 57 is embedded in the chip sensor 60. The sensing element 57 is turned around the above-mentioned axis "J" so that the detection reference axis "G" of the sensing element 57 inclines by an angle "δ" relative to the traveling direction of the vehicle "C" in the clockwise direction in FIG. 6(b).

The chip sensor 60 having the internal structure as described above is fixed on the surface of the sub-circuit board 61 that is perpendicular to the base plate 20 of the apparatus, which is placed stationarily on the bottom of the casing 21 so as to be in parallel therewith, as shown in FIGS. 6(b) and 6(c). When the navigation apparatus 1 according to the third embodiment, including the casing 21 is mounted in the central console 102, the rear side of the navigation apparatus 1 is placed lower than the front side thereof so that the navigation apparatus 1 in itself inclines on the vertical plane including the traveling direction of the vehicle "C" in the same manner as the thirst embodiment of the present invention. As a result, the chip sensor 60 is placed in a turned state in the counterclockwise direction in FIG. 6(b) so that the difference in angle between the detection reference axis "G" as shown in FIG. 6(b) and the traveling direction of the vehicle "C" is minimized by an angle "δ" as shown in FIG. 6(b).

When the detection of the acceleration applied to the vehicle "C" is made through the chip sensor 60, a correction operation is carried out optionally to correct a possible error due to the mounting angle of the navigation apparatus 1, through a processing circuit (not shown) included therein based on the similar error correction program to the conventional prior art, in the same manner as the first embodiment of the present invention. In this case, the sensing element 57 inclines by the predetermined angle "δ" to compensate the mounting angle of the navigation apparatus 1, as shown in FIG. 6(b), with the result that there actually suffices execution of the processing operation for correcting only the difference in angle between the inclination angle of the navigation apparatus 1 mounted in the central console 102 relative to the horizontal direction (i.e., the mounting angle of the navigation apparatus) and the above-mentioned angle "δ".

In the structure as described above of the chip sensor 60 of the third embodiment of the present invention, the sensing element 57 is placed in an inclined state in the process of embedding the sensing element 57 into the main body 55 so that the above-mentioned difference in angle is minimized, thus making it possible to detect accurately the direction and amount of acceleration.

In case where the detected results from the chip sensor 60 is subjected to an optional correction operation such as a processing operation to provide more accurate results, the range of possible error to be corrected is remarkably expanded, since the above-mentioned difference in angle is minimized in the chip sensor 60 in itself.

In addition, it is possible to amount the chip sensor 60 on the navigation apparatus 1 in the same manner as the conventional measures or through the conventional fitting elements during the manufacture of the navigation apparatus 1 of the third embodiment of the present invention, without taking into consideration any measures to reduce the above-mentioned difference in angle. As a result, an effective use of the limited space in the casing of the navigation apparatus 1 can be ensured, the manufacturing cost can be decreased and the yields can be improved.

The inclination direction and angle "δ" of the sensing element 57 are predetermined so that the above-mentioned difference in angle is minimized, taking into consideration the mounting angle, by which the navigation apparatus 1 including the chip sensor 60 is mounted on the vehicle "C", thus enabling the chip sensor 60 in the navigation apparatus 1 to detect accurately the direction and amount of acceleration. In addition, the chip sensor 60 per se has the structure in which the above-mentioned difference in angle is minimized, without need to provide independently any mechanism for inclining the chip sensor 60 in itself. The above-mentioned structure has no influence on the effective use of the limited space in the navigation apparatus 1, which is mountable on the vehicle "C", thus permitting reduction in the manufacturing cost of the navigation apparatus 1 and improvement in yields.

In the above-described third embodiment of the present invention, the sensing element 57 inclines relative to the main body 55. In the modification of the third embodiment, it may be adopted a structure that the detection reference axis "G" in itself is inclined in the process of manufacturing the IC chip serving as the sensing element 65 as shown in FIG. 7, without inclining the sensing element 65 in itself embedded in the main body of the chip sensor relative thereto. Such a modification provides the same effects as the third embodiment.

The above-mentioned modification in which a capacitance detecting type accelerometer is used as the sensing element 65 will be described in detail below with reference to FIG. 7.

In the above-described chip sensor 60 of the third embodiment of the present invention, the central axis of the sensing element 65 (i.e., of the three directional central axes, the central axis, which approximates to the horizontal direction and be in parallel with the surface of the sub-circuit board 61) is placed in parallel with the detection reference axis "G". Alternatively, the detection reference axis "G" in itself is inclined by the above-mentioned angle "δ" relative to the main body of the sensing element 65 in the capacitance detecting type accelerometer 65, which includes a movable member 70 connected to an external terminal 71, and capacitance detecting members 66, 68 and 72 connected to external terminals 67, 69 and 73, respectively, as shown in FIG. 7.

The above-described sensing element 65 is embedded in the main body of the chip sensor, without inclining the sensing element 65 around the axis "J" as shown in FIG. 6(a). The chip sensor in which such the sensing element 65 is embedded, is fixed on the sub-circuit board 61 as shown in FIGS. 6(b) and 6(c), thus providing the same effects as those in the above-described third embodiment of the present invention.

In the embodiments and modification as described above, the inclination angle "δ" is set, taking into consideration the advantages of the correction processing based on the appropriate program. Alternatively, in case where there is achieved no correction operation utilizing a processing treatment and the mounting angle of the navigation apparatus is previously obtained, the mounting angle may be completely compensated by the angle "δ" in the embodiments and modification as described above.

In the embodiments and modification as described above, the direction and amount of physical quantity such as acceleration is detected when the vehicle "C" drives forward. It is also possible to apply the present invention to an accurate detection of the physical quantity such as acceleration when reversing the vehicle "C".

In the embodiments and modification as described above, the acceleration and the like are exemplified as the physical quantity having the direction. The present invention may be applied to a direct detection of velocity of the vehicle.

According to the first aspect of the present invention as described in detail, securing the sensing unit on the supporting unit so that the above-mentioned difference in angle is minimized makes it possible to accurately detect the amount and direction of the physical quantity.

In case where the detected results from the sensing apparatus is subjected to an optional correction operation such as a processing operation to provide more accurate results, the range of possible error to be corrected is remarkably expanded, since the above-mentioned difference in angle is minimized in the sensing apparatus in itself.

In addition, it is possible to amount the sensing apparatus on an electronic equipment in the same manner as the conventional measures or through the conventional fitting elements during the manufacture of such an electronic equipment, without taking into consideration any measures to reduce the above-mentioned difference in angle. As a result, an effective use of the limited space in the casing of the electronic equipment can be ensured, the manufacturing cost can be decreased and the yields can be improved.

According to the second aspect of the present invention, the above-mentioned difference in angle is minimized by connection of the mounting member, which is placed between the sensing unit and the base member, with the sensing unit, thus making it possible to accurately detect the physical quantity in a simple structure. In addition, with respect to the other structural components than the above, there can be used the corresponding same components in the conventional sensing apparatus, thus making it possible to decrease the manufacturing cost and improve the yields.

According to the third aspect of the present invention, merely forming the slit in the mounting member so as to incline to the predetermined direction, by which the above-mentioned difference in angle can be minimized, makes it possible to support the sensing unit on the mounting member in an appropriate manner, thus reducing the manufacturing cost of the sensing apparatus.

The structure in which the counter-slit of the sensing unit engages with the slit of the mounting member ensures an appropriate mounting state of the sensing unit on the mounting member, thus making it possible to manufacture the sensing apparatus in simple manufacturing processes.

According to the fourth aspect of the present invention, the sensing unit includes the supporting shaft, which is inclined so that the above-mentioned difference in angle is minimized. It is therefore possible to accurately detect physical quantity in a simple structure, even when the sensing unit further includes the detection discs supported on the supporting shaft, thus permitting reduction in the manufacturing cost and improvement in yields.

According to the fifth aspect of the present invention, the structure in which said detection discs comprises a stationary electrode, which is stationarily supported on said supporting shaft and a pair of movable electrodes, which are supported on said supporting shaft on opposite sides of said stationary electrode so as to be movable in a direction of said supporting shaft provides an accurate detection of physical quantity in a simple manner, thus permitting reduction in the manufacturing cost and improvement in yields.

According to the sixth aspect of the present invention, the sensing unit is inclined so that the above-mentioned difference in angle is minimized, taking into consideration a mounting angle, by which the electronic equipment including the sensing unit is mounted on the movable body, thus enabling the sensing unit in the electronic equipment to detect accurately the direction and amount of physical quantity. In addition, the sensing apparatus per se has a structure in which the above-mentioned difference in angle is minimized, without need to provide independently any mechanism for inclining the sensing apparatus in itself. The above-mentioned structure has no influence on the effective use of the limited space in the electronic equipment, which is mountable on the movable body, thus permitting reduction in the manufacturing cost of the electronic equipment and improvement in yields.

The entire disclosure of Japanese Patent Application No. 2002-27439 filed on Feb. 4, 2002 including the specification, claims, drawings and summary is incorporated herein by reference in its entirety.

What is claimed is:

1. A sensing apparatus comprising:
   a sensing unit for detecting a direction and an amount of physical quantity applied thereto, the sensing unit having a detection reference axis along which the direction and the amount of the physical quantity are detected; and
   a supporting unit for stationarily supporting the sensing unit, the supporting unit comprising a base member and a mounting member secured to the blase member;
   wherein:
   the mounting member has a slit formed therein;
   the sensing unit has a counter-slit formed therein; and
   the sensing unit is mounted on the mounting member so that the counter-slit of the sensing unit engages with the slit of the mounting member, the sensing unit being inclined at an angle relative to the supporting unit, the angle being predetermined so as to reduce a difference in angle between the detection reference axis and the direction of the physical quantity actually applied to the sensing unit when detecting the direction and the amount of the physical quantity.

2. A sensing apparatus comprising:
   a sensing unit for detecting a direction and an amount of physical quantity applied thereto, the sensing unit having a detection reference axis along which the direction and the amount of the physical quantity are detected; and a supporting unit for stationarily supporting the sensing unit;

wherein:

the sensing unit is inclined at an angle relative to the supporting unit, the angle being predetermined so as to reduce a difference in angle between the detection reference axis and the direction of the physical quantity actually applied to the sensing unit when detecting the direction and the amount of the physical quantity;

the sensing unit comprises a plurality of detection discs disposed in parallel with each other and a supporting shaft passing through a center of each of the detection discs to support the detection discs thereon, the supporting shaft serving as the detection reference axis; and the supporting shaft is secured to the supporting unit.

3. The sensing apparatus as claimed in claim 2, wherein:

the detection discs comprise a stationary electrode, which is stationarily supported on the supporting shall and a pair of movable electrodes, which are supported on the supporting shaft on opposite sides of the stationary electrode so as to be movable in a direction of the supporting shaft.

4. Electronic equipment to be mounted on a movable body, comprising:

a main body; and a sensing apparatus provided in said main body, the sensing apparatus comprising (i) a sensing unit for detecting a direction and an amount of physical quantity applied thereto, the sensing unit having a detection reference axis along which the direction and the amount of the physical quantity are detected; and (ii) a supporting unit for stationarily supporting the sensing unit, the supporting unit comprising a base member and a mounting member secured to the base member;

wherein:

the mounting member has a slit formed therein;

the sensing unit has a counter-slit formed therein; and the sensing unit is mounted on the mounting member so that the counter-slit of the sensing unit engages with the slit of the mounting member, the sensing unit being inclined at an angle relative to the supporting unit, the angle being predetermined so as to reduce a difference in angle between the detection reference axis and the direction of the physical quantity actually applied to the sensing unit when detecting the direction and the amount of the physical quantity.

5. Electronic equipment to be mounted on a movable body, comprising:

a main body; and a sensing apparatus provided in the main body, the sensing apparatus comprising (i) a sensing unit for detecting a direction and an amount of physical quantity applied thereto, the sensing unit having a detection reference axis along which the direction and the amount of the physical quantity are detected; and (ii) a supporting unit for stationarily supporting the sensing unit;

wherein:

the sensing unit is inclined at an angle relative to the supporting unit, the angle being predetermined so as to reduce a difference in angle between the detection reference axis and the direction of the physical quantity actually applied to the sensing unit when detecting the direction and the amount of the physical quantity;

the sensing unit comprises a plurality of detection discs disposed in parallel with each other and a supporting shaft passing through a center of each of the detection discs to support the detection discs thereon, the supporting shaft serving as the detection reference axis; and the supporting shaft is secured to the supporting unit.

6. The electronic equipment as claimed in claim 5, wherein:

the detection discs comprise a stationary electrode, which is stationarily supported on the supporting shaft and a pair of movable electrodes, which are supported on the supporting shaft on opposite sides of the stationary electrode so as to be movable in a direction of the supporting shaft.

* * * * *